United States Patent [19]

Izume

[11] Patent Number: 5,813,810
[45] Date of Patent: Sep. 29, 1998

[54] FASTENER FOR CIRCULAR AND SQUARE APERTURES

[75] Inventor: Tomoharu Izume, Toyota, Japan

[73] Assignee: Nifco Inc., Yokohama, Japan

[21] Appl. No.: 888,297

[22] Filed: Jul. 3, 1997

Related U.S. Application Data

[63] Continuation of Ser. No. 563,489, Nov. 28, 1995, abandoned.

[30] Foreign Application Priority Data

Nov. 30, 1994 [JP] Japan ..................................... 6-319535

[51] Int. Cl.[6] .............................. F16B 13/02; F16B 19/00
[52] U.S. Cl. ............................ 411/510; 411/908; 411/913
[58] Field of Search .................................... 411/509, 510, 411/908, 913

[56] References Cited

U.S. PATENT DOCUMENTS

| | | | |
|---|---|---|---|
| 4,402,641 | 9/1983 | Arff | 411/410 |
| 4,551,189 | 11/1985 | Peterson | 411/510 |
| 4,705,442 | 11/1987 | Fucci | 411/510 |
| 4,728,238 | 3/1988 | Chisholm et al. | 411/510 |
| 4,902,182 | 2/1990 | Lewis | 411/510 |
| 4,938,645 | 7/1990 | Wollar | 411/510 |

FOREIGN PATENT DOCUMENTS 2-6923 2/1990 Japan.

*Primary Examiner*—Brian K. Green
*Assistant Examiner*—Robert G. Santos
*Attorney, Agent, or Firm*—Oblon, Spivak, McClelland, Maier & Neustadt, P.C.

[57] ABSTRACT

A fastener made of a synthetic resin material is usable for both a circular engagement hole and a square engagement hole which are approximately the same in size, and includes a head, a leg depending from the head, and two groups of vertically multilayered flexible fins formed on a periphery of the leg so as to extend radially outward. Some of the fins stay in the engagement hole and are flexed by the wall of the engagement hole when the leg has been inserted into one of the engagement holes and others of the fins are thrust out of the engagement hole and restore to their respective original states, thereby preventing the leg from being extracted from the engagement hole. The leg has a lateral cross section circumscribed by both the circle of the circular engagement hole and the square of the square engagement hole and includes a pair of opposed arcs registering with the circle to hold the leg concentric with the circle and a pair of opposed parallel straight sides following the arcs and registering with parts of opposed sides of the square to hold the leg concentric with the square. Each of the two groups of flexible fins forms an angle of 45° to the parallel straight sides.

6 Claims, 2 Drawing Sheets

FASTENER FOR CIRCULAR AND SQUARE APERTURES

This application is a Continuation of application Ser. No. 08/563,489, filed on Nov. 28, 1995, now abandoned.

BACKGROUND OF THE INVENTION

1. Field of the Invention

The present invention relates to a fastener made of a synthetic resin material and used for attaching a carpet, a panel or other ornamental article to the inside of an automobile body, for example.

2. Description of the Prior Art

A fastener of this type is disclosed in Japanese Patent Publication No. 2-6923, for example. The prior art fastener comprises a head, a leg depending from the head, and a plurality of flexible fins projecting from the periphery of the leg radially outward and arranged in a multistage manner in the axial direction of the leg. When the leg is inserted into an engagement hole formed in a panel or the like, the fins staying in the hole are flexed by the inside surface of the hole while those thrust out of the lower surface of the panel restore to their original state, thereby preventing the leg from being extracted from the hole. With this structure, it is necessary to prepare a plurality of such fasteners having legs of various shapes conforming to those of engagement holes and use them properly. Even when a panel has circular holes and square holes approximate in size to the circular holes, for example, it is necessary to prepare fasteners having legs of two different shapes in lateral cross section.

The present invention has been accomplished in view of the above disadvantage and has as its object to provide an inexpensive fastener usable for both a circular engagement hole and a square engagement hole which are approximately the same in size.

SUMMARY OF THE INVENTION

To attain this object, according to the present invention there is provided a fastener made of a synthetic resin material, usable for both a circular engagement hole and a square engagement hole which are approximately the same in size, and comprising a head, a leg depending from the head and two groups of vertically multilayered flexible fins formed on a periphery of the leg so as to extend radially outward, some of the fins staying in the engagement hole and being flexed by a wall of the engagement hole when the leg has been inserted into one of the engagement holes and others of the fins being thrust out of the engagement hole and restoring to their original states, thereby preventing the leg from being extracted from the engagement hole, the leg having a lateral cross section circumscribed by both a circle of the circular engagement hole and a square of the square engagement hole and comprising a pair of opposed arcs registering with the circle to hold the leg concentric with the circle and a pair of opposed parallel straight sides following the arcs and registering with parts of opposed sides of the square to hold the leg concentric with the square, each of the two groups of flexible fins forming an angle of 45° to the parallel straight sides.

The flexible fins are preferably inclined upward toward the head of the fastener.

The above and other objects, advantages and features of the present invention will become apparent to those skilled in the art from the description to be given hereinbelow with reference the accompanying drawings.

DETAILED DESCRIPTION OF THE PREFERRED EMBODIMENT

Now, the present invention will be described in detail with reference to one embodiment of the fastener shown in the accompanying drawings.

Figure 1:
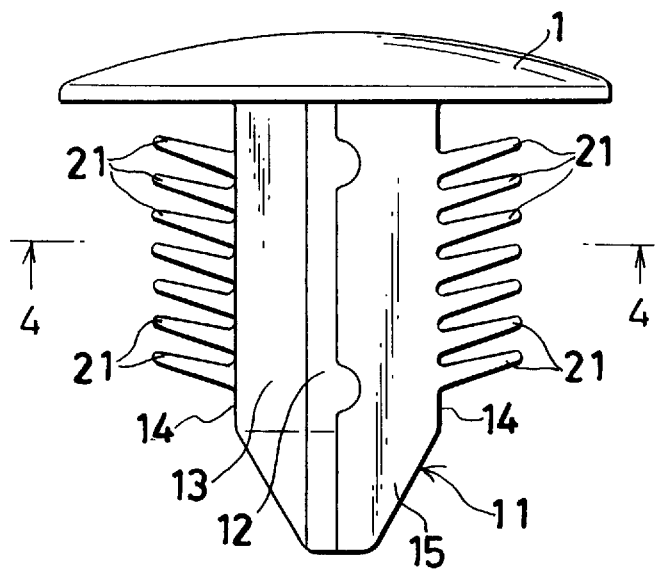
FIG. 1 is a front view showing one embodiment of a fastener according to the present invention.
Figure 2:
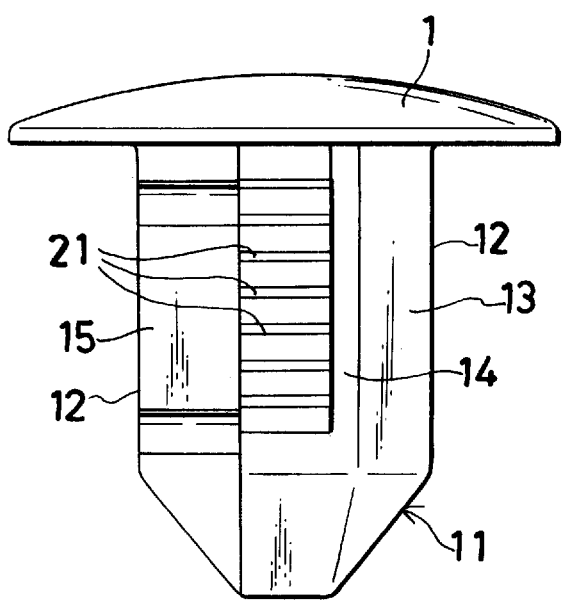
FIG. 2 is a side view of the fastener.
Figure 3:
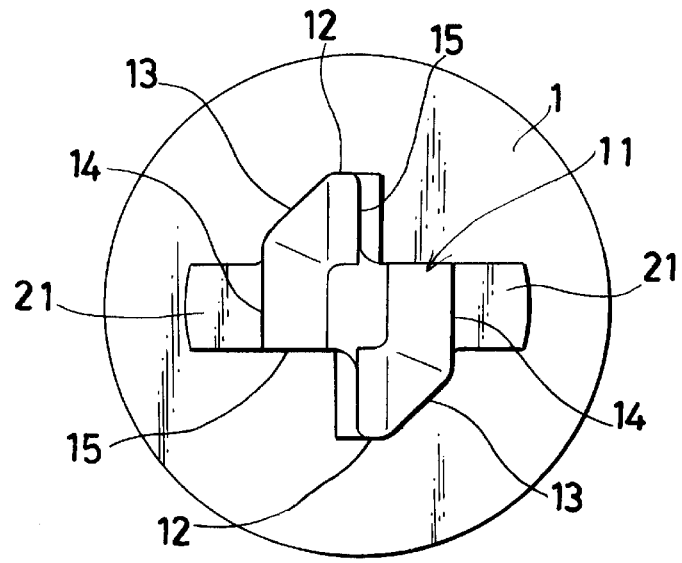
FIG. 3 is a bottom view of the fastener.

As shown in FIGS. 1 to 3, the fastener comprises a head 1 in the shape of a sector of a sphere and having a flat bottom surface, a leg 11 depending from the flat bottom surface of the head 1, and two groups of vertically multilayered flexible fins 21 extending radially outward from the periphery of the leg 11.

Figure 4:
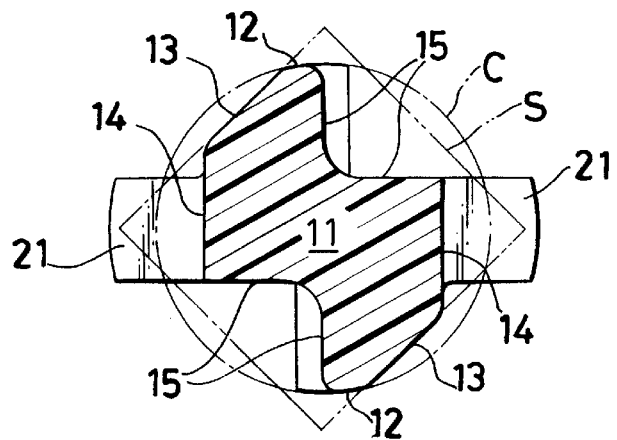
FIG. 4 is a cross section taken along line 4—4 in FIG. 1.

As shown in FIG. 4, the leg 11 has a lateral cross-sectional configuration circumscribed by both a circle of a circular engagement hole C shown by the one-dot chain line and a square of a square engagement hole S shown by the two-dot chain line and comprising a pair of opposed arcs 12 centro-symmetrical to each other and registering with the circle to hold the leg 11 concentric with the circle, a pair of first opposed straight sides 13 centro-symmetrical to each other, following the arcs 12 and registering with parts of opposed sides of the square to hold the leg 11 concentric with the square, a pair of second straight sides 14 centro-symmetrical to each other and following the first straight sides 13, and a pair of connection sides 15 centro-symmetrical to each other, following the second straight sides 14 and terminating in the arcs 12.

Each of the connection sides 15 defines a substantially L-shaped channel. The leg 11 has a tapered leading end for easy insertion into the circular or square engagement hole C or S. In this embodiment, the circular engagement hole has a diameter of 10 mm and the square engagement hole has a side of 8.5 mm.

The flexible fins 21 in each group are inclined upward from one of the second straight sides 14 of the leg 21 toward the head 1 and extend beyond both the circle and the square. They form an angle of 75° to the axis of the leg 11 and an angle of 45° to the first straight side 13 of the leg 11 as viewed in a section perpendicular to the length of the leg 11.

Figure 5:
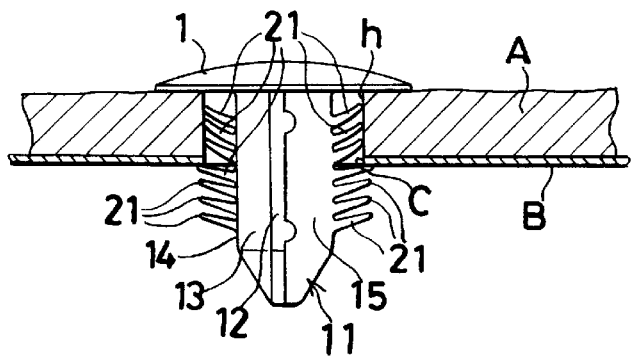
FIG. 5 an explanatory front view of the fastener applied to fasten a carpet to an automobile body, with the carpet and the automobile body sectioned and partially cutaway.

An example of using the fastener to fasten a carpet A to an automobile body panel B will be described with reference to FIG. 5.

The automobile body panel B has circular engagement holes C and/or square engagement holes S (not shown in FIG. 5) and the carpet A has holes h corresponding in position and size to the engagement holes C and/or S when the carpet A is set in position on the automobile body panel B.

The fastener is inserted from the leading end of the leg 11 into the carpet hole h and engagement hole C until the flat bottom surface of the head 1 abuts on the upper surface of the carpet A. The fins 21 are flexed in the holes h and C during this insertion and restore to their original states when thrust out of the engagement hole C. As a result, the fins 21 remaining in the holes h and C are kept flexed therein and two of the fins having thrust out of the engagement hole C and restored to their respective original states engage with a portion of the automobile body panel B around the engagement hole C while the arcs 12 register with the carpet hole h and engagement hole C to hold the leg 11 concentric with the carpet hole h and engagement hole C, thereby fastening the carpet A to the automobile body panel B.

In the case of a square carpet hole h and a square engagement hole S, the first straight sides 13 of the leg 11 register with these holes h and S while the fins 21 in these holes S and h are flexed by a pair of diagonal corners of the engagement hole S and a corresponding pair of diagonal corners of the carpet hole h, thereby holding the leg 11 concentric with these holes S and h. There is no other difference from the case of the circular engagement hole C.

As described above, the configuration of the leg 21 of the fastener in lateral cross section is circumscribed by both the circle of the circular engagement hole C and the square of the square engagement hole S and comprises a pair of opposed arcs 12 registering with the circle, a pair of first opposed straight sides 13 following the arcs and registering with parts of opposed sides of the square, a pair of second opposed straight sides 14 following the first sides 13 and having a plurality of flexible fins 21 extending therefrom, and a pair of connection sides 15 following the second sides 14 and terminating in the arcs 12. For this reason, the fastener can be used for both a circular engagement hole and a square engagement hole which are approximately the same in size. This reduces the number of kinds of fasteners that have to be prepared and results in money saving.

Since the flexible fins 21 are inclined upward toward the head 1 of the fastener, the fins 21 are flexed toward the leg 11 when the leg 11 is pushed into the engagement hole C or S. Therefore, the leg 11 can be easily inserted into the engagement hole C or S with a small force.

Furthermore, since two of the flexible fins 21 thrust out of the engagement hole C or S engage with the periphery of the engagement hole, the leg 11 is difficult to extract from the engagement hole.

In the example described above, the fastener was used to fasten a carpet to an automobile body panel. However, an ornamental panel can be used in place of the carpet and, in this case, the head 1 of the fastener may be integral with the ornamental panel. Although the connection sides 15 of the leg 11 were described as being substantially L-shaped, they can instead be flat insofar as they fall within both the circle of a circular engagement hole and the square of a square engagement hole. In addition, the angle between the leg 11 and the fins 21 may be 90° instead of 75°.

As has been described in the foregoing, according to the present invention there is provided a synthetic resin fastener that is usable for both a circular engagement hole and a square engagement hole, easy to insert into the engagement holes and difficult to extract from the engagement holes.

What is claimed is:

1. A fastener made of a synthetic resin material, usable for both a circular engagement hole and a square engagement hole which are approximately the same in size, and comprising:

a head;
a leg depending from the head; and
two groups of vertically multilayered flexible fins formed on a periphery of the leg so as to extend radially outward, each said fin, when divided by a central line in the direction in which the fins extend, having two segments symmetrical with each other relative to the central line, some of the fins being capable of staying in the engagement hole and being flexed by a wall of the engagement hole when the leg has been inserted into one of the engagement holes and others of the fins being capable of being thrust out of the engagement hole and restoring to their original states when the leg has been inserted into one of the engagement holes, thereby preventing the leg from being extracted from the engagement hole;
said leg, when in an undeformed state, having a lateral cross section capable of being circumscribed by both a circle of the circular engagement hole and a square of the square engagement hole and comprising a pair of opposed arcs for registering with the circle when the leg has been inserted into one of the engagement holes to hold the leg concentric with the circle and a pair of opposed parallel straight sides following the arcs and for registering with parts of opposed sides of the square when the leg has been inserted into one of the engagement holes to hold the leg concentric with the square;
each of the two groups of flexible fins forming an angle of 45° to the parallel straight sides as viewed in a section perpendicular to the length of the leg.

2. A fastener according to claim 1, wherein said flexible fins are inclined upward toward said head.

3. A fastener made of a synthetic resin material, usable for both a circular engagement hole and a square engagement hole which are approximately the same in size, and comprising:

a head;
a leg depending from the head; and
two groups of vertically multilayered flexible fins formed on a periphery of the leg so as to extend radially outward, each said fin, when divided by a central line in the direction in which the fins extend, having two segments symmetrical with each other relative to the central line, some of the fins being capable of staying in the engagement hole and being flexed by a wall of the engagement hole when the leg has been inserted into one of the engagement holes and others of the fins being capable of being thrust out of the engagement hole and restoring to their original states when the leg has been inserted into one of the engagement holes, thereby preventing the leg from being extracted from the engagement hole;
said leg, when in an undeformed state, having a lateral cross section capable of being circumscribed by both a circle of the circular engagement hole and a square of the square engagement hole and comprising a pair of opposed arcs centro-symmetrical to each other and for registering with the circle to hold the leg concentric with the circle when the leg has been inserted into one of the engagement holes, a pair of first opposed straight sides centro-symmetrical to each other, following the arcs and for registering with parts of opposed sides of the square when the leg has been inserted into one of the engagement holes to hold the leg concentric with the square, a pair of second straight sides centro-symmetrical to each other and following the first straight sides, and a pair of connection sides centro-symmetrical to each other, following the second straight sides and terminating in the arcs;

each of the two groups of flexible fins forming an angle of 45° to the first straight sides as viewed in a section perpendicular to the length of the leg.

4. A fastener according to claim 3, wherein said flexible fins are inclined upward toward said head.

5. A fastener according to claim 3, wherein said flexible fins extend from the second straight sides.

6. A fastener according to claim 3, wherein said connection sides are substantially L-shaped.

* * * * *